F. P. HESS.
FLAT WORK IRONER.
APPLICATION FILED FEB. 21, 1911.

1,016,992.

Patented Feb. 13, 1912.
4 SHEETS—SHEET 2.

Witnesses:
Nathan C. Lombard
Mary C. Smith

Inventor:
Franklin P. Hess,
by Walter E. Lombard,
Atty.

F. P. HESS.
FLAT WORK IRONER.
APPLICATION FILED FEB. 21, 1911.
1,016,992.
Patented Feb. 13, 1912.
4 SHEETS—SHEET 4.
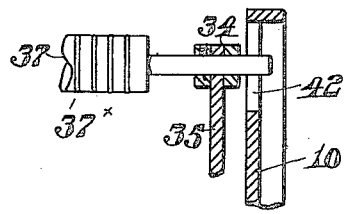
Fig. 4.
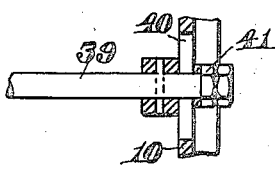
Fig. 5.
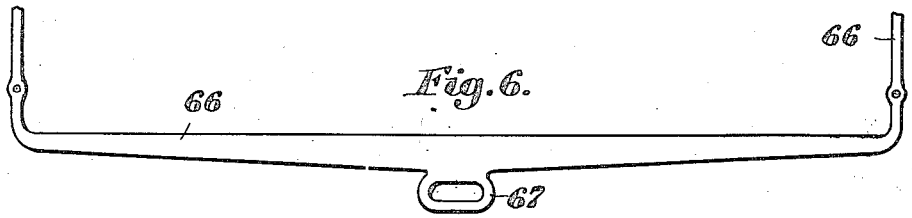
Fig. 6.
Fig. 7.
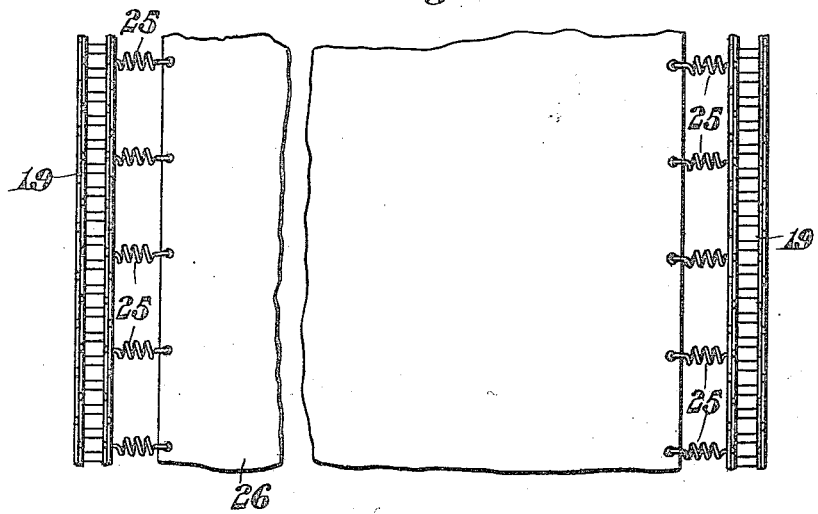
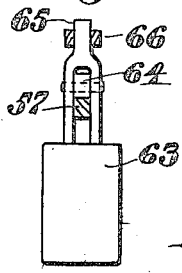
Fig. 8.
Witnesses:
Nathan C. Lombard
Mary C. Smith
Inventor:
Franklin P. Hess,
by Walter E. Lombard,
Atty.

UNITED STATES PATENT OFFICE.

FRANKLIN P. HESS, OF LYNN, MASSACHUSETTS.

FLAT-WORK IRONER.

1,016,992.     Specification of Letters Patent.     Patented Feb. 13, 1912.

Application filed February 21, 1911. Serial No. 610,038.

*To all whom it may concern:*

Be it known that I, FRANKLIN P. HESS, a citizen of the United States of America, and a resident of Lynn, in the county of Essex and State of Massachusetts, have invented certain new and useful Improvements in Flat-Work Ironers, of which the following is a specification.

This invention relates to ironing machines or mangles, particularly adapted for use in steam laundries, and particularly to that class of such machines in which an endless apron is utilized to convey the articles to be ironed into contact with suitable steam heated revoluble cylinders.

The invention consists in certain novel features of construction and arrangement of parts which will be readily understood by reference to the description of the drawings and to the claims hereinafter given.

Figure 1:
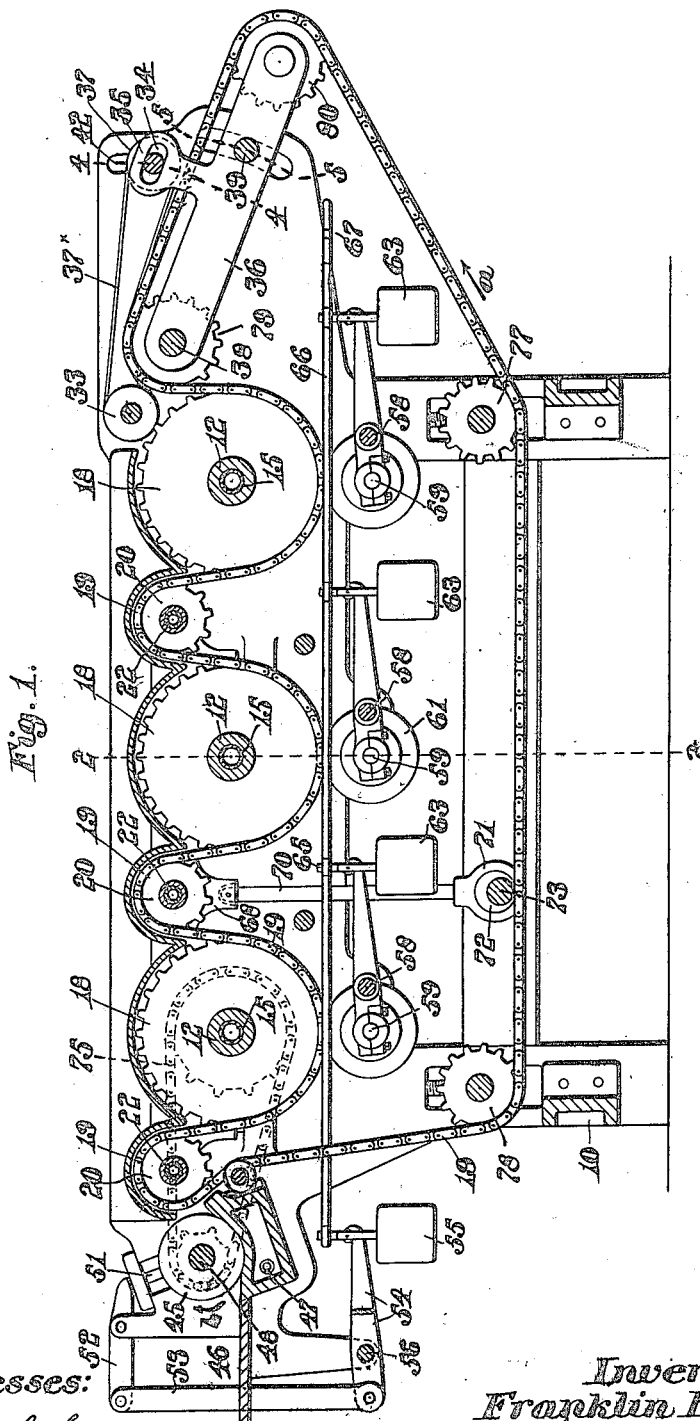
Figure 2:
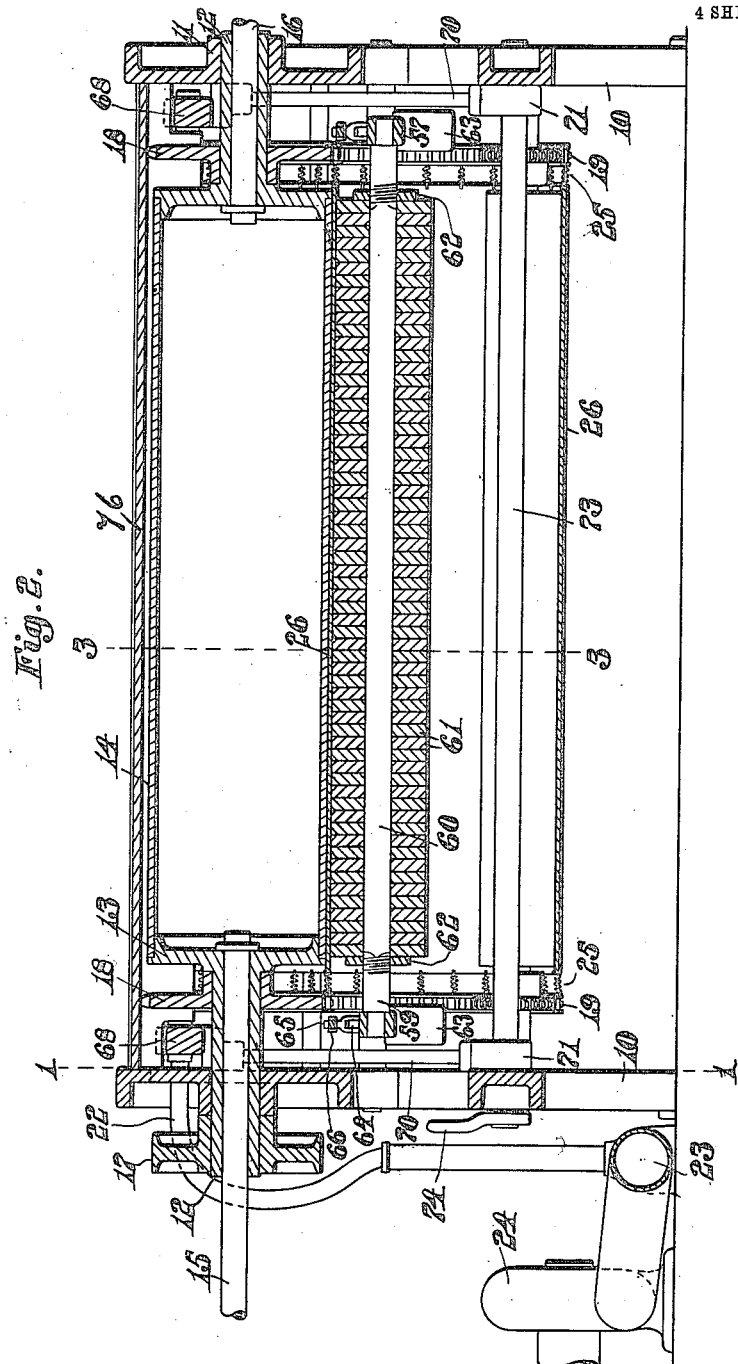
Figure 3:
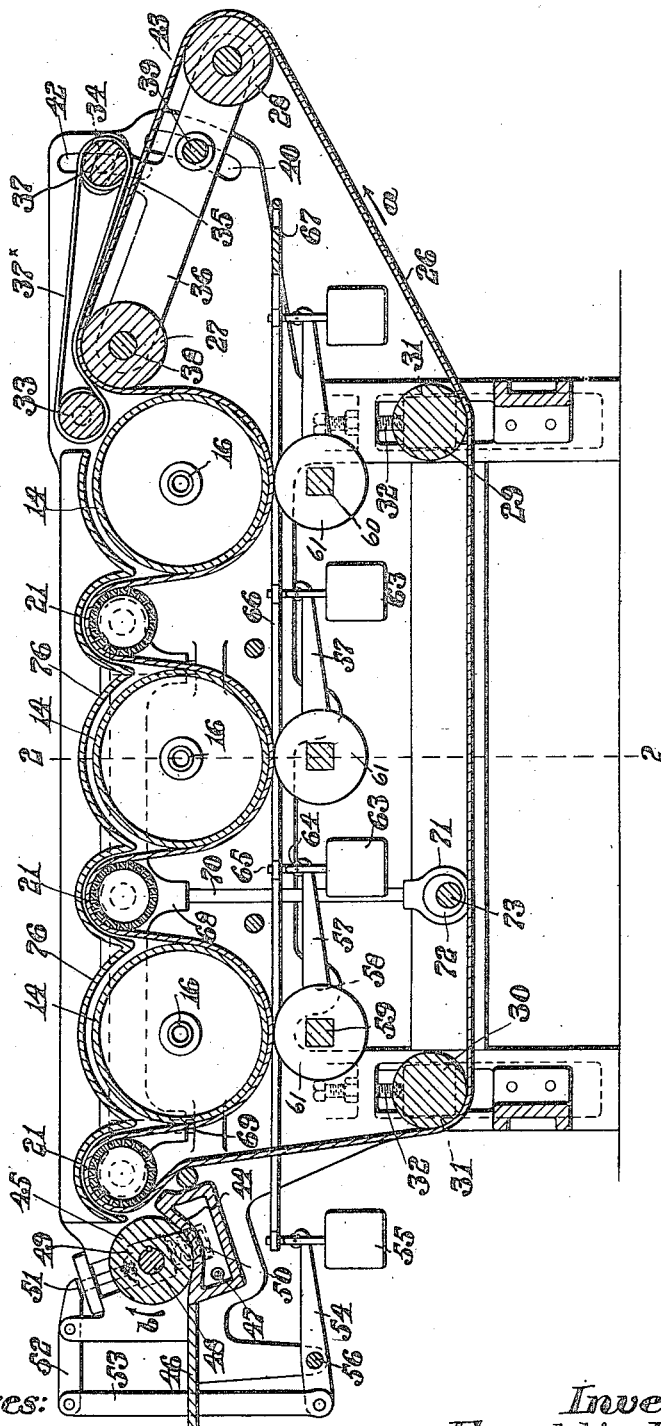

Of the drawings: Figure 1 represents a vertical longitudinal section of a machine embodying the features of the present invention. Fig. 2 represents a transverse section of the same, the cutting plane being on line 2—2 on Fig. 1. Fig. 3 represents a vertical longitudinal section of the same, the cutting plane being on line 3—3 on Fig. 2. Fig. 4 represents a sectional detail, the cutting plane being on line 4—4 on Fig. 1. Fig. 5 represents a similar detail, the cutting plane being on line 5—5 on Fig. 1. Fig. 6 represents a plan of one end of the weight shifter. Fig. 7 represents a plan of a portion of the apron, and showing its connections with the endless chains for moving the same, and Fig. 8 represents an elevation of one of the weights, showing in section the lever arm on which it is mounted, and the movable member for shifting said weight.

Similar characters designate like parts throughout the several figures of the drawings.

In the drawings, 10 represents the side frames, provided with suitable bearings 11 of any well-known construction, in which are adapted to revolve the trunnions 12 formed upon the heads 13 of the steam cylinders 14. Each steam cylinder is provided with a steam inlet pipe 15 and an outlet pipe 16, by means of which steam is permitted to pass through the cylinder 14 and heat the same. Secured to the outer end of one of the trunnions 12 is a pulley 17, by which said cylinder is adapted to be revolved.

Each of the trunnions 12 has secured thereto, so as to revolve therewith, a sprocket wheel 18, with which engages the endless sprocket chain 19. This chain 19 passes under the sprocket wheels 18 and over sprocket wheels 20 secured to and revoluble with the air cylinders 21, one of which is provided for each steam cylinder 18. These air cylinders 21 are provided with peripheral perforations extending through the cylindrical wall thereof, and one end of each of said cylinders is connected to a flexible pipe 22, which, in turn, communicates with a pipe 23 connected to a blower or suction fan 24 of any well-known construction. The chains 19, at intervals throughout their entire length, are provided with yielding members such as the springs 25, the other ends of which are connected with the endless apron 26. This apron 26 passes over the rollers 27 and 28, and under the rollers 29 and 30. The rollers 29 and 30 are revolubly mounted in suitable boxes 31, adjustable, by means of the members 32 mounted in the frames 10, to keep the apron taut at all times. The springs 25, between the chains 19 and the edges of the apron 26, serve to keep the apron stretched laterally at all times.

When the machine is in operation, the apron travels in the direction of the arrow *a* on Fig. 3 of the drawings. As it passes over the rollers 28 and 27, it passes partially around and under the ironing or smoothing cylinders 14 and partially around and over the air cylinders 21, all as clearly indicated in Fig. 3 of the drawings. The portion of the apron between the rollers 27 and 28 serves as a support upon which to place the articles to be ironed.

Revolubly mounted in the frames 10 is a grooved auxiliary roller 33, and revolubly mounted in the slot 34 in the extension 35 from the pivoted frame 36 is another grooved auxiliary roller 37. These rollers 33 and 37 carry a plurality of endless cords 37ˣ, which are adapted to contact with the endless apron 26 as it passes over the roller 27 and be moved thereby. The frame 36 is pivoted at 38 and is provided with a tie-rod 39 extending through said frame 36 and through slots 40 in the side frames 10. The outer ends of this tie-rod 39 are provided with clamping members 41, by which the frame may be clamped when adjusted in various positions about the pivot 38 to vary the height of the roller 28 thus adapting it for different operators. As the frame 36 is raised and lowered, it will cause similar movement to the roller 37, which is provided with trunnions at either end extending through slots 42 concentric to the axis of the shaft 33, so that as the said roller 37 changes its position in the raising and lowering of the frame 36, the cords or other members carried by the rollers 33 and 37 will always remain taut. The articles to be ironed are placed upon the apron 26 at 43, and will be carried thereby over the roller 27 being held in contact with the apron by means of the cords 37×. The articles will then be conveyed, by means of the apron, underneath the ironing or smoothing cylinder 14, and then will be carried upwardly over the air cylinders 21, underneath the second ironing or smoothing cylinder 14, over the second air cylinder 21, under the third ironing or smoothing cylinder 14, and over the third and last air cylinder 21, from which they will be delivered from the apron onto the curved stationary iron 44. A pressure roller 45, retaining the articles in contact with said stationary iron 44, is revolved in the direction of the arrow $b$ on Fig. 3, to convey the articles being ironed onto the table 46. As the articles pass around the ironing or smoothing cylinders 14, the right side of the articles will be ironed, and as the same articles pass between the pressure roller 45 and the stationary iron 44, the wrong side of the articles will be slightly ironed prior to being deposited upon the delivery table 46.

Steam is admitted to the stationary iron 44 through the inlet 47. The ends of the shaft 48, to which the roller 45 is secured, are mounted in boxes 49, slidable substantially vertically in the side frames 10, each box being superimposed upon a spring 50 tending to separate the roller 45 from the iron 44. Each box 49 is provided with an upwardly extending projection 51 against which one end of the lever 52 bears, the opposite end being connected by means of a link 53 with a pivoted lever 54 having mounted upon its opposite end a weight 55. The weight 55 is sufficient when at the outer end of the lever 54 to overcome the tension of the spring 50 and retain the roller 45 in contact with the stationary iron 44. Whenever, however, the weight 55 is moved sufficiently toward the pivot 56 of the lever 54, the tension of the spring 50 will overcome any action of the weight 55 and cause the roller 45 to be separated from the stationary iron 44. In a similar manner the levers 57 are pivoted to the side frames 10 at 58, and have mounted in one end a revoluble shaft 59 having a squared portion 60 intermediate its ends upon which are secured a plurality of disks 61 of felt or similar yielding material clamped firmly together by means of the clamping nuts or other members 62 threaded to the ends of the shaft 59. Each of the levers 57 has mounted upon its outer end a weight 63 which is sufficient to retain the disks 61 forming a revoluble pressure roll in contact with the under face of the endless apron 26, thereby forcing said apron into contact with the periphery of the ironing or smoothing cylinder 14. Each of the weights 55 and 63 is provided with a revoluble truck or wheel 64 adapted to travel along the upper edge of the lever 57. Each of these weights 55 and 63 is also provided with upwardly extending projections 65 which pass through openings in the reciprocating member 66, one end of which is provided with a handle 67 by which said member may be reciprocated. It is obvious, by referring to the drawings, that, when desired, the operator may, by grasping the handle 67, move the members 66 sufficiently to move the weights 55 and 63 toward the pivots of the levers 54 and 57, and thereby change the leverage. Obviously, when these weights have been moved sufficiently far toward the pivots 56 and 58, the tension of the spring 50 and the weight of the pressure rolls 61 will be sufficient to cause a separation between the rollers 45 and 61, and the stationary iron 44 and the revoluble ironing cylinders 14 respectively. The air cylinders 21 are revolubly mounted in vertically reciprocating frames 68 one at each side of the machine provided with guide members 69 movable in bearings formed upon the side frames 10. From the center of each frame 68 a rod 70 extends downwardly, and is provided with a strap 71 encircling an eccentric 72 mounted upon the shaft 73. This shaft 73 is provided at one end with a handle 74, by which the eccentrics 72 may be turned about the axis of the shaft 73 to raise and lower the frames 68, and with them the air cylinders 21.

In the operation of the device, the articles to be ironed are placed upon the movable apron 26 at 43, and are carried thereby underneath the endless cords 37, and then successively underneath the various ironing cylinders 14, and the right side of the goods is thus caused to be ironed. As the apron with the goods thereon passes over the air cylinders 21, the operation of the blower 24 will act to suck through the perforations in these cylinders any moisture in the apron passing partially around the same. By this means the apron is kept free from moisture, and its life is greatly extended, while the ironing of the articles is greatly facilitated and accomplished more quickly. As the articles pass from the last air cylinder 21, the reverse side of the article is ironed while passing between the stationary iron 44 and the roller 45, which roller is driven from the shaft of one of the cylinders 14 by means of the sprocket chain 75.

As has already been described, the roller 28 at the receiving end of the endless apron 26 may be raised and lowered to accommodate it to the height of the different operators. While flat goods, such as table-cloths, towels, and similar articles, are being ironed, the roller 45 is held in contact with the iron 44 by means of the weight 55, and the pressure rolls 61 similarly act upon the under face of the apron 26 to retain it in contact with the ironing cylinders 14, being held in contact therewith by means of the weights 63. When it is desired, however, to iron articles having buttons thereon, it is necessary that the pressure rolls 61 and the roller 45 should be separated from the ironing cylinders 14 and the stationary iron 44, and in order to accomplish this separation the operator simply moves the reciprocating member 66 toward the delivery end of the machine, thereby shifting the weights 63 and 55 sufficiently to permit the weights of the rollers 61 and the springs 50 to effect such separation. The endless apron 26 may be kept taut at all times by adjusting the position of the rollers 29 and 30, or this may be accomplished by means of the eccentrics 72, thereby raising and lowering the frames 68 carrying the air cylinders 21. The apron is stretched laterally by means of the springs 25 interposed between the edges of said apron and the carrying chain 19.

Above the ironing cylinders 14 and the air cylinders 21 is secured a curved guide plate 76 which serves the purpose of directing the movement of the articles upon the apron 26 as the aprons pass partially around the peripheries of the air cylinders 21. The chains 19 are kept in the same plane with the apron 26 as the latter passes around the various cylinders and rollers by passing partially around the sprocket wheels 18 and 20 upon the trunnions of the ironing cylinders 14 and the air cylinders 21 respectively, and partially around the sprocket wheels 77 and 78 upon the shafts of the rollers 29 and 30 respectively, and partially around the sprocket wheels 79 and 80 upon the shafts of the rollers 27 and 28 respectively.

It is believed that the operation and many advantages of the invention will be thoroughly understood from the foregoing.

Having thus described my invention, I claim:

1. In a machine of the class described, the combination with a series of ironing or smoothing cylinders and an endless apron passing partially around the cylinders, of perforated cylinders over which the apron passes after leaving the ironing cylinders; and means for creating a suction in said perforated cylinders.

2. In a machine of the class described, the combination with a series of ironing or smoothing cylinders and an endless apron passing partially around the cylinders, of perforated cylinders over which the apron passes after leaving the ironing cylinders; a pipe from each perforated cylinder; and a suction fan with which said pipe communicates.

3. In a machine of the class described, the combination with a series of ironing or smoothing cylinders and an endless apron passing partially around the cylinders, of pairs of pivoted weighted members below the apron; shafts revoluble one in each pair of members; and a plurality of felt disks on said shafts forming pressure rollers coacting with said apron and ironing cylinders.

4. In a machine of the class described, the combination with a series of ironing or smoothing cylinders and an endless apron passing partially around the cylinders, of pairs of pivoted members below the apron; shafts revoluble one in each pair of members and having a squared portion intermediate its ends; a plurality of felt disks on said squared portion; clamping members on said shaft for forcing said disks together; and weights on said members adapted to retain said disks in contact with the apron as it passes partially around an ironing cylinder.

5. In a machine of the class described, the combination with a series of ironing or smoothing cylinders and an endless apron passing partially around the cylinders; of a plurality of pairs of pivoted members below the apron; a pressure roller revolubly mounted in one end of each pair of pivoted members; a movable weight at the opposite end of each member adapted to retain said roller in contact with said apron; and means for simultaneously shifting the position of all of said weights relative to said members.

6. In a machine of the class described, the combination with a series of ironing or smoothing cylinders and an endless apron passing partially around the cylinders; of a plurality of pairs of pivoted members below the apron; a pressure roller revolubly mounted in one end of each pair of pivoted members; a movable weight at the opposite end of each member adapted to retain said roller in contact with said apron; and a reciprocating member adapted in its movement to shift the position of all of said weights simultaneously.

7. In a machine of the class described, the combination with a series of ironing or smoothing cylinders and an endless apron passing partially around the cylinders; of a plurality of pairs of pivoted members below the apron; a pressure roller revolubly mounted in one end of each pair of pivoted members; a movable weight at the opposite end of each member adapted to retain said roller in contact with said apron; and a reciprocating member provided with openings each adapted to receive a vertical projection on a weight.

8. In a machine of the class described, the combination with a series of ironing or smoothing cylinders and an endless apron passing partially around the cylinders, of perforated cylinders over which the apron passes after leaving the ironing cylinders; a pipe leading from the end of each perforated cylinder; an air moving device connected to said pipe; and means for raising and lowering said perforated cylinders.

9. In a machine of the class described, the combination with a series of ironing or smoothing cylinders and an endless apron passing partially around the cylinders, of perforated cylinders over which the apron passes after leaving the ironing cylinders; pipes leading from the ends of said perforated cylinders; and means for raising or lowering all said perforated cylinders simultaneously.

10. In a machine of the class described, the combination with a series of ironing or smoothing cylinders and an endless apron passing partially around the cylinders, of a pivoted frame carrying a roller over which said endless cylinder apron passes and provided with slotted supports for an auxiliary roller positioned above said apron; another auxiliary roller between said frame roller and one of said cylinders; and endless members passing around said auxiliary rollers and serving to retain articles upon said apron while being fed to said cylinders.

11. In a machine of the class described, the combination with a series of ironing or smoothing cylinders and an endless apron passing partially around the cylinders, of a pivoted frame carrying a roller over which said endless cylinder apron passes and provided with slotted supports for an auxiliary roller positioned above said apron; another auxiliary roller between said frame roller and one of said cylinders; endless members passing around said auxiliary rollers and coacting with said apron; and side frames provided with curved slots through which the ends of the shaft of one of said auxiliary rollers extend, said slots being of such curvature as to retain said endless members taut under all conditions.

12. In a machine of the class described, the combination with a series of ironing or smoothing cylinders and an endless apron passing partially around the cylinders; a perforated drying cylinder over which the apron is adapted to pass from each ironing cylinder; and a member over each drying cylinder adapted to guide the articles on said apron.

13. In a machine of the class described, the combination with a series of ironing or smoothing cylinders and an endless apron passing partially around the cylinders; a perforated drying cylinder over which the apron is adapted to pass from each ironing cylinder; an iron adapted to receive the articles as they pass from the last drying cylinder; and a pressure roll co-acting with said iron.

14. In a machine of the class described, the combination with a series of ironing or smoothing cylinders and an endless apron passing partially around the cylinders; a perforated drying cylinder over which the apron is adapted to pass from each ironing cylinder; an iron adapted to receive the articles as they pass from the last drying cylinder; a pressure roll co-acting with said iron; and means for separating said pressure roll from said iron.

15. In a machine of the class described, the combination with a series of ironing or smoothing cylinders and an endless apron passing partially around the cylinders; sprocket wheels on the shaft of each cylinder; endless chains carried by said sprocket wheels; and members extending at intervals from each edge of said apron to said chains.

16. In a machine of the class described, the combination with a series of ironing or smoothing cylinders and an endless apron passing partially around the cylinders; sprocket wheels on the shaft of each cylinder; endless chains carried by said sprocket wheels; and yielding members extending at intervals from each edge of said apron to said chains.

Signed by me at 4 Post Office Sq., Boston, Mass., this 16th day of February, 1911.

FRANKLIN P. HESS.

Witnesses:
WALTER E. LOMBARD,
NATHAN C. LOMBARD.